United States Patent
Park et al.

(10) Patent No.: US 7,738,564 B2
(45) Date of Patent: Jun. 15, 2010

(54) FILTER FOR ELIMINATING DISCONTINUITY OF BLOCK-BASED ENCODED IMAGE, AND METHOD THEREOF

(75) Inventors: Eun-kyoung Park, Seoul (KR); Woo-sung Shim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1462 days.

(21) Appl. No.: 11/105,511

(22) Filed: Apr. 14, 2005

(65) Prior Publication Data

US 2006/0002476 A1 Jan. 5, 2006

(30) Foreign Application Priority Data

Jul. 2, 2004 (KR) .................. 10-2004-0051519

(51) Int. Cl.
*H04N 7/12* (2006.01)
(52) U.S. Cl. .............. 375/240.29; 375/240; 375/240.01
(58) Field of Classification Search .................. 375/240, 375/240.01, 240.29; 348/580; 382/268
See application file for complete search history.

(56) References Cited

U.S. PATENT DOCUMENTS

| | | | | |
|---|---|---|---|---|
| 4,602,285 | A | * 7/1986 | Beaulier et al. .............. | 348/580 |
| 6,285,801 | B1 | * 9/2001 | Mancuso et al. ............. | 382/268 |
| 6,320,905 | B1 | 11/2001 | Konstantinides | |
| 2001/0019634 | A1 | 9/2001 | Lainema et al. | |
| 2002/0118399 | A1 | 8/2002 | Estevez et al. | |
| 2003/0202608 | A1 | 10/2003 | MacInnis et al. | |
| 2004/0017515 | A1 | 1/2004 | Lange et al. | |

FOREIGN PATENT DOCUMENTS

| | | |
|---|---|---|
| EP | 1 439 711 A2 | 7/2004 |
| JP | 2003-333597 A | 11/2003 |
| KR | 2002-0095761 A | 12/2002 |

(Continued)

OTHER PUBLICATIONS

Sima M et al., "An Efficient Architecture for Adaptive Deblocking Filter of H.264/AVC Video Coding", Feb. 2004, IEEE Transactions on Consumer Electronics, IEEE Inc. New York, US, pp. 292-296, XP001198142.

(Continued)

*Primary Examiner*—Allen Wong
(74) *Attorney, Agent, or Firm*—Sughrue Mion, PLLC

(57) ABSTRACT

A method for eliminating discontinuity of block boundaries of an image encoded in units of blocks and an apparatus thereof. A filter for eliminating discontinuity of block boundaries of an image encoded in units of blocks with a predetermined size includes: a vertical edge filtering unit which eliminates the discontinuity in the vertical direction of the blocks, by filtering sequentially in units of blocks; a determination unit which determines a start point of discontinuity filtering in the horizontal direction according to a filtering mode of a macroblock formed with the blocks; and a horizontal edge filtering unit. If the vertical direction discontinuity filtering of the blocks is finished to the filtering start point determined by the determination unit, discontinuity filtering in the horizontal direction of the blocks is sequentially performed for which the vertical direction discontinuity filtering is finished. Accordingly, time taken for filtering is reduced and unnecessary memory is not required.

25 Claims, 5 Drawing Sheets

FOREIGN PATENT DOCUMENTS

KR    2003-0086076 A    11/2003

OTHER PUBLICATIONS

International Organization for Standardization: ITU-T Rec. H. 264, May 2003, XP002342096.

Wiegand T et al., "Overview of the H.264/AVC Video Coding Standard", IEEE Transactions on Circuits and Systems for Video Technology, IEEE Inc. New York, US, vol. 13, No. 7, Jul. 2003, pp. 560-576, XP001169882.

* cited by examiner

FIG. 1
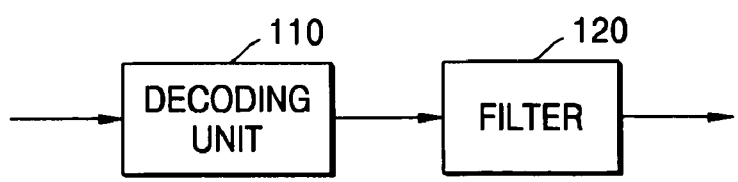
FIG. 2A  FIG. 2B
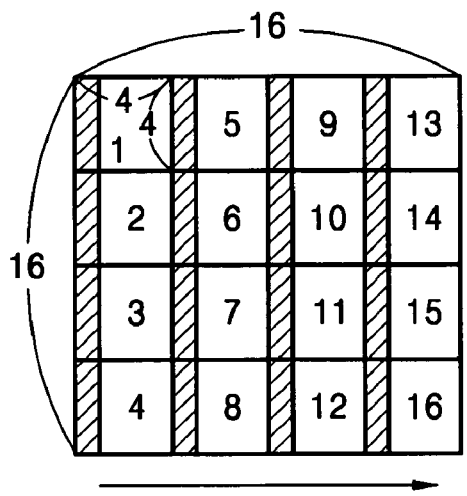 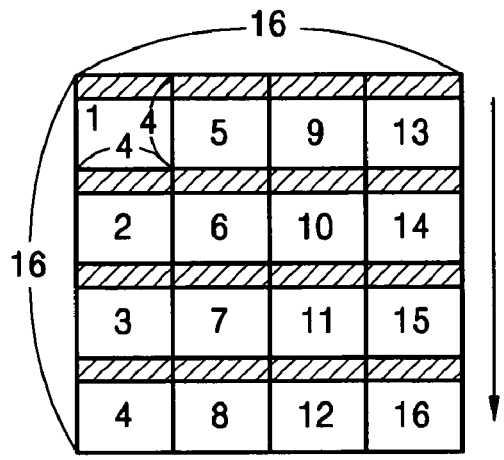
FIG. 2C  FIG. 2D
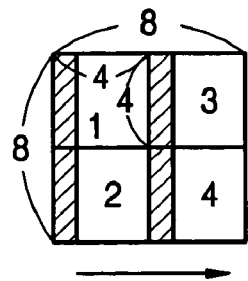 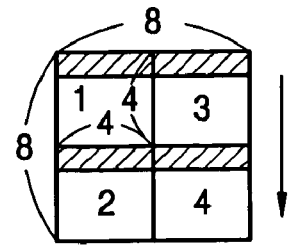

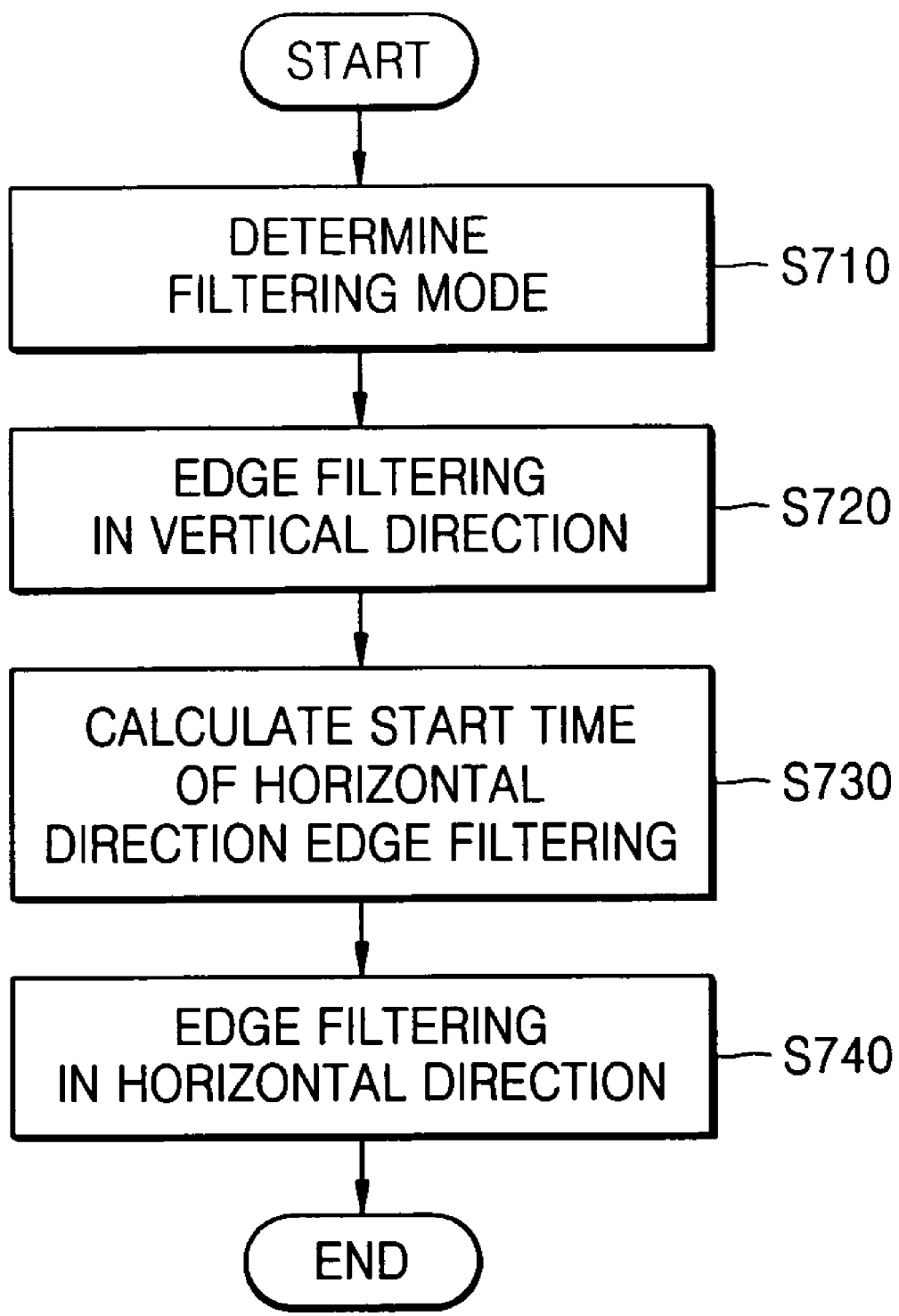

FILTER FOR ELIMINATING DISCONTINUITY OF BLOCK-BASED ENCODED IMAGE, AND METHOD THEREOF

BACKGROUND OF THE INVENTION

This application claims priority from Korean Patent Application No. 10-2004-0051519, filed on Jul. 2, 2004, in the Korean Intellectual Property Office, the disclosure of which is incorporated herein in its entirety by reference.

1. Field of the Invention

Apparatuses and methods consistent with the present invention relate to digital image processing, and more particularly, to a method for eliminating discontinuity of block boundaries of an image encoded in units of blocks and an apparatus thereof.

2. Description of the Related Art

When an image is transmitted through a network with a predetermined bandwidth, or stored in a storage medium, it is important to encode the image data. Many research activities have been being carried out to transmit and store efficiently image data, and among a variety of image encoding methods, transform-based encoding methods are most widely used. In the transform-based encoding, the discrete cosine transform (DCT) technology has been widely used.

Meanwhile, among a variety of image coding standards, there is an H.264 AVC video coding standard. In the H.264 AVC standard, DCT is applied to predicting an infra frame and an inter frame in order to obtain a high compression ratio and is used to encode the difference between a predicted image and an original image. Through the DCT transform, information with lower importance among DCT coefficients is discarded such that the quality of the image when decoded through inverse transform is lowered. That is, because of the compression, the transmission bitrate of image data is lowered, while the quality of the decoded image is degraded. DCT is performed in units of blocks, each obtained by dividing an image into a predetermined size. Since the DCT is performed thus, in units of blocks, a blocking effect in which discontinuity on a boundary between blocks appears occurs.

Motion compensation in units of blocks is another cause of the blocking effect. Motion information of a current block that can be used for decoding an image is obtained by one motion vector determined for each block with a predetermined size in a frame. Also, a predictive motion vector (PMV) is obtained by using a motion vector of a current block and a motion vector of a block adjacent to the current block. The thus obtained PMV is subtracted from an actual motion vector for encoding.

Motion-compensated blocks are generated by copying interpolated pixel values from blocks in other locations in the previous reference frames. Accordingly, pixel values of each block are not linked smoothly and discontinuity occurs on the boundary between blocks. In addition, in the process of copying, the discontinuity between blocks in a reference frame is transferred to a block to be compensated directly. Accordingly, even though a block of a 4×4 size is used in the H.264 AVC, filtering of the decoded image should be performed in order to eliminate the discontinuity on the block boundary.

The blocking effect occurs in the process of block-based transform and quantization as described above, and causes a degradation phenomenon of picture quality in which when a compression ratio increases, the discontinuity on the block boundaries appear regularly as if tiles are laid. As an example of a filter to eliminate the discontinuity, there is a deblocking filter. Meanwhile, in the blocking effect, the discontinuity of an image on the block boundaries includes discontinuity on the horizontal direction edge and discontinuity on the vertical direction edge.

Generally, in a deblocking filter, a vertical direction edge is first filtered and then, a horizontal direction edge is filtered. Accordingly, since it is difficult to perform edge filtering in the vertical direction and edge filtering in the horizontal direction at the same time, time for filtering becomes longer and a memory to temporarily store the result of the vertical direction edge filtering is needed.

SUMMARY OF THE INVENTION

The present invention provides an apparatus and method for more quickly eliminating a blocking effect or discontinuity of an image, by which in eliminating the blocking effect of an image, a predetermined time after filtering of an edge in the vertical direction is first started, filtering of an edge in the horizontal direction is performed together.

According to an aspect of the present invention, there is provided a filter for eliminating discontinuity of block boundaries of an image encoded in units of blocks with a predetermined size including: a vertical edge filtering unit which eliminates the discontinuity in the vertical direction of the blocks, by filtering sequentially in units of blocks; a determination unit which determines a start point of discontinuity filtering in the horizontal direction according to a filtering mode of a macroblock formed with the blocks; and a horizontal edge filtering unit which if vertical direction discontinuity filtering of the blocks is finished to the filtering start point determined by the determination unit, performs sequentially discontinuity filtering in the horizontal direction of the blocks for which the vertical direction discontinuity filtering is finished.

The vertical edge filtering unit and the horizontal edge filtering unit may perform filtering in order from a block which forms a macroblock and is located on the top left-hand side of the macroblock, to downward direction.

When horizontal direction edge filtering is performed in a macroblock encoded in MacroBlock Adaptive Frame Field (MBAFF) mode, if a top macroblock pair is a field macroblock pair and a current macroblock belongs to a frame macroblock pair and a top macroblock, the determination unit may determine that it is an exceptional case, and determine a start point of discontinuity filtering in the vertical direction.

According to another aspect of the present invention, there is provided a method for eliminating discontinuity of block boundaries of an image encoded in units of blocks with a predetermined size including: eliminating the discontinuity in the vertical direction of the blocks, by filtering sequentially in units of blocks; determining a start point of discontinuity filtering in the horizontal direction according to a filtering mode of a macroblock formed with the blocks; and if vertical direction discontinuity filtering of the blocks is finished to the determined filtering start point, performing sequentially discontinuity filtering in the horizontal direction of the blocks for which the vertical direction discontinuity filtering is finished.

In eliminating the discontinuity in the vertical direction of the blocks and performing sequentially discontinuity filtering in the horizontal direction, filtering may be sequentially performed in order from a block which forms a macroblock and is located on the top left-hand side of the macroblock, to a downward direction.

In determining a start point of discontinuity filtering in the horizontal direction, when horizontal direction edge filtering is performed in a macroblock encoded in MBAFF mode, if a top macroblock pair is a field macroblock pair and a current macroblock belongs to a frame macroblock pair and a top macroblock, it may be determined as an exceptional case, and a start point of discontinuity filtering in the vertical direction may be determined.

BRIEF DESCRIPTION OF THE DRAWINGS

The above and other aspects of the present invention will become more apparent by describing in detail exemplary embodiments thereof with reference to the attached drawings in which:

FIG. 1 is a block diagram of a moving picture reproducing apparatus including a filter for eliminating image discontinuity according to an embodiment of present invention;

FIG. 2A and FIG. 2B are diagrams showing boundary pixels to be filtered for luminance blocks and the filtering order;

FIG. 2C and FIG. 2D are diagrams showing boundary pixels to be filtered for chrominance blocks and the filtering order;

FIG. 7 is a flowchart of the aspects performed by a filtering method of the present invention.

DETAILED DESCRIPTION OF EXEMPLARY EMBODIMENTS OF THE INVENTION

The present invention will now be described more fully with reference to the accompanying drawings, in which exemplary embodiments of the invention are shown.

FIG. 1 shows a moving picture reproducing apparatus including a filter for eliminating image discontinuity according to an exemplary embodiment of the present invention, including a decoding unit 110 that decodes an input encoded image. Since the encoding method of the image may be one of a variety of methods such as MPEG-2, MPEG-4, and H.264, the decoding unit decodes the input image according to the encoding method of the image. A filter 120 is provided, which may be a deblocking filter, and performs filtering of pixels on the boundaries of M×N blocks. In the present exemplary embodiment, a case in which filtering is performed in units of 4×4 blocks will be explained as an example. Filtering is performed on the basis of a macroblock, and for all macroblocks in a picture, filtering is sequentially performed in units of blocks with a predetermined size. In order to filter each macroblock, pixel values of filtered blocks on the top of, and on the left-hand side of a current macroblock are used. At this time, luminance components and chrominance components are divided and separately filtered.

FIG. 2A and FIG. 2B are diagrams showing boundary pixels to be filtered for luminance blocks and the filtering order.

First, discontinuity in the vertical direction means the discontinuity of an image on a vertical boundary between blocks, and discontinuity in the horizontal direction means the discontinuity of an image on a horizontal boundary.

In each macroblock, filtering pixels on the vertical boundary of blocks is first performed. As indicated by the arrow in FIG. 2A, the vertical direction boundary pixels are filtered in a direction from the left-hand side in the macroblock to the right-hand side, and with the filtering result, filtering horizontal direction boundary pixels is performed. The horizontal direction boundary pixels are filtered in a direction from the top to the bottom as indicated by the arrow in FIG. 2B. Since filtering is performed on the basis of a macroblock, filtering for eliminating luminance discontinuity is performed for four pixels lines, each formed with 16 pixels. The filtering order of 4×4 blocks for the vertical direction boundary pixels and the horizontal direction boundary pixels is indicated by numbers in FIG. 2A and FIG. 2B.

FIG. 2C and FIG. 2D are diagrams showing boundary pixels to be filtered for chrominance blocks and the filtering order. A chrominance block has an 8×8 size, a fourth of that of the luminance block. Like the luminance components filtering, filtering the chrominance components is also performed in units of 4×4 blocks and in an order indicated by the numbers shown in FIG. 2C and FIG. 2D.

Figure 3A:
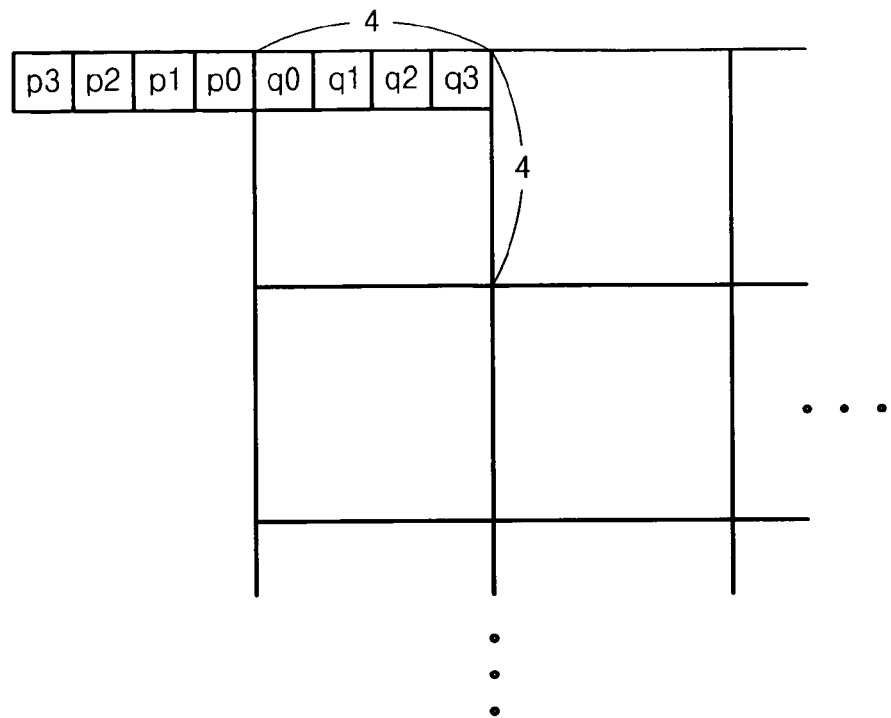
FIGS. 3A and 3B are showing pixels used in filtering.
Figure 3B:
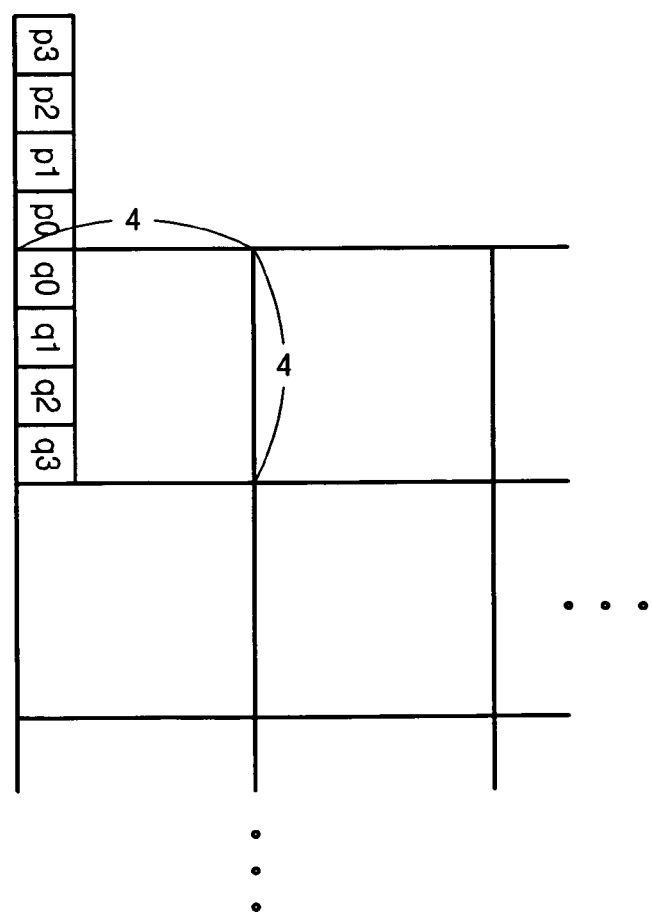

FIGS. 3A and 3B show pixels used in filtering. Pixels are determined on the basis of the boundary of a 4×4 block, and changed pixel values are calculated by a predetermined filtering formula. Mainly, p0, p1, p2, q0, q1, and q2 pixel values are changed. In addition to filtering luminance components, filtering chrominance components is also performed in an order similar to that of luminance components.

Figure 4:
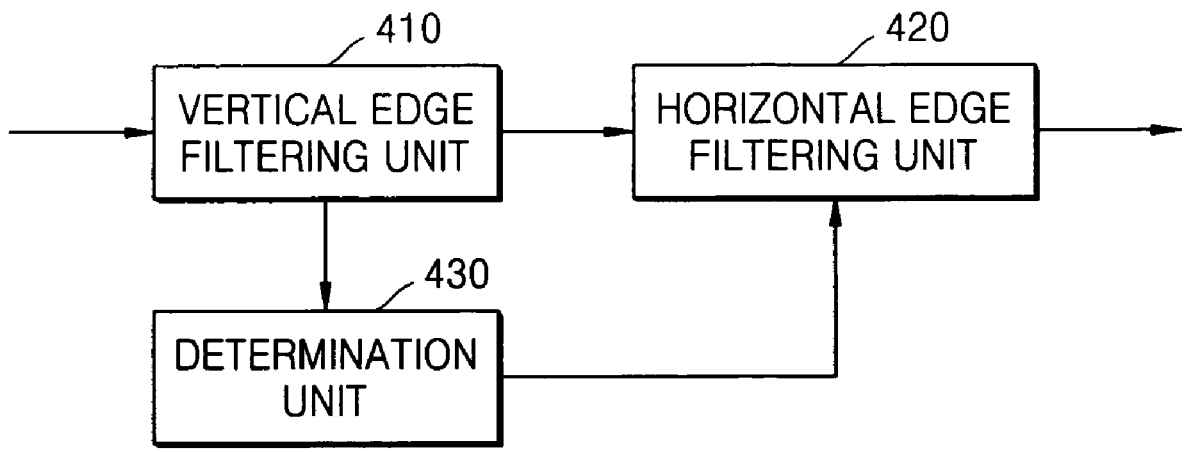
FIG. 4 is a block diagram of a filter of the present invention.

FIG. 4 is a block diagram of a filter of an exemplary embodiment of the present invention. Referring to FIG. 4, the filter of the present invention includes a vertical edge filtering unit 410 which filters an edge in the vertical direction, a horizontal edge filtering unit 420 which filters an edge in the horizontal direction, and a determination unit 430. More specifically, in an operation of an ordinary deblocking filter, a filtering mode is first determined, an edge in the vertical direction in the determined mode is filtered, and then, for the filtering result, an edge in the horizontal direction is filtered. The deblocking order is identical both in a luminance block and a chrominance block. A filtering mode is indicated, for example, according to data in a macroblock in H.264 moving picture encoding, and will be explained later with reference to FIG. 5.

Since the vertical direction edge is first filtered and then, for the filtering result, the horizontal direction edge is filtered, the vertical direction edge-filtering and the horizontal direction edge filtering cannot be performed at the same time. Accordingly, a memory capable of temporarily storing the result of the vertical direction edge filtering is further needed.

In an exemplary embodiment of the present invention, the vertical direction edge filtering and the horizontal direction edge filtering are made to be performed at the same time. A predetermined time after vertical direction edge filtering is first started and before the vertical direction edge filtering is finished, the horizontal direction edge filtering is performed. Accordingly, after a predetermined time, the vertical direction edge filtering and the horizontal direction edge filtering are performed simultaneously. The determination unit 430 determines a start time of the horizontal direction edge filtering. When to start the horizontal direction edge filtering will be explained with reference to FIGS. 6A and 6B.

Figure 5:
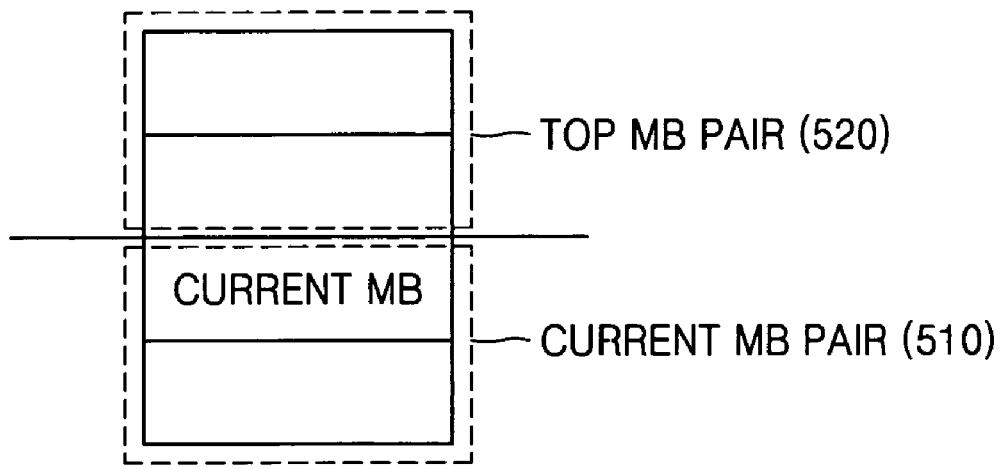
FIG. 5 is a diagram showing macroblock pairs encoded in MBAFF mode.

FIG. 5 is a diagram showing macroblock pairs encoded in a MacroBlock Adaptive Frame Field (MBAFF) mode. In H.264 moving picture encoding, there is a frame mode in which all macroblock data is frame data, a field mode in which all macroblock data is field data, and a MBAFF mode in which frame data and field data coexist.

Referring to FIG. 5, in filtering an edge in the vertical direction in a macroblock encoded in MBAFF mode, if a top macroblock pair (top MB pair) 520 is a field macroblock pair and a current macroblock belongs to a frame macroblock pair (frame MB pair) 510 and at the same time is a top macroblock, filtering of one horizontal direction edge should be performed twice. That is, since each of a top block and a bottom block forming the top macroblock pair (top MB pair) 520 should be filtered, filtering twice is needed. Accordingly, this case is regarded as an exceptional case.

Figure 6A:
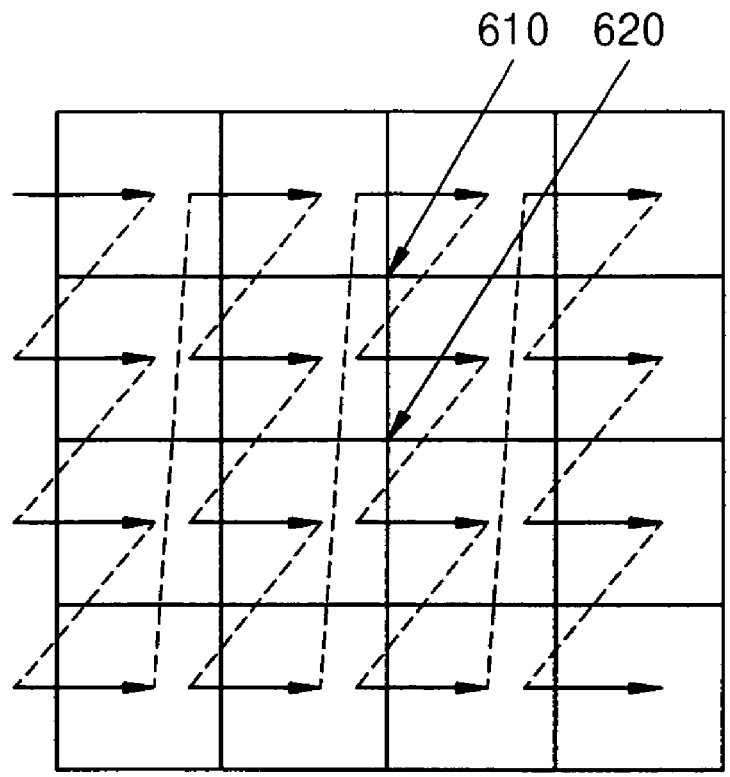
FIGS. 6A and 6B are showing start points of horizontal direction edge filtering of an ordinary case and an exceptional case.
Figure 6B:
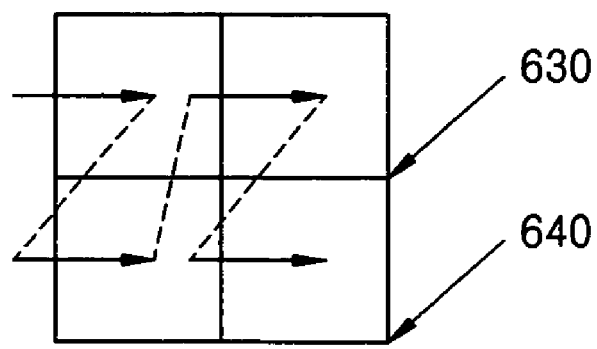

FIGS. 6A and 6B show start points of horizontal direction edge filtering of an ordinary case and an exceptional case. For luminance blocks, as shown in FIG. 6A, in an ordinary case, vertical direction edge filtering is performed to point 610, and then horizontal direction edge filtering and vertical direction edge filtering are performed together. In the exceptional case, vertical direction edge filtering is performed to point 620, and then horizontal direction edge filtering and vertical direction edge filtering are performed together. For chrominance blocks, as shown in FIG. 6B, in an ordinary case, vertical direction edge filtering is performed to point 630, and then horizontal direction edge filtering and vertical direction edge filtering are performed together. In the exceptional case, vertical direction edge filtering is performed to point 640, and then vertical direction edge filtering and horizontal direction edge filtering are performed together.

FIG. 7 is a flowchart of the steps performed by a filtering method of an exemplary embodiment of the present invention. The filtering mode of a current macroblock is determined in operation S710. In the determined mode, a vertical direction edge is filtered in operation S720. Then, it is determined when to start the horizontal direction edge filtering in operation S730.

In operation S740, if the mode determined in operation S710 corresponds to the exceptional case described above with reference to FIG. 5, horizontal direction edge filtering is performed by using two horizontal direction edge filters, or else, horizontal direction edge filtering is performed by using one horizontal direction edge filter. Accordingly, two horizontal direction edge filters are disposed. By doing so, while vertical direction edge filtering is performed, the horizontal direction edge filtering can be performed concurrently.

The filtering method described above can be implemented as a computer program. Codes and code segments forming the program can be easily inferred by programmers in the technology field of the present invention. Also, the program can be stored in computer readable media, and read and executed by a computer to implement the filtering method. The computer readable media includes, as an example, magnetic recording media, and optical recording media.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

According to the present invention as described above, a predetermined time after filtering of an edge in the vertical direction is first started, filtering of an edge in the horizontal direction is performed together such that time for filtering is reduced and an unnecessary memory requirement can be removed.

What is claimed is:

1. A filter for eliminating discontinuity of block boundaries of an image encoded in units of blocks with a predetermined size, the filter comprising:
    a vertical edge filtering unit which eliminates a vertical direction discontinuity of the blocks, by sequentially filtering the blocks;
    a determination unit which determines a start point of filtering to eliminate a horizontal direction discontinuity of the blocks according to a filtering mode of a macroblock formed with the blocks; and
    a horizontal edge filtering unit which, if the filtering of the vertical direction discontinuity of the blocks reaches the start point determined by the determination unit, performs, sequentially, filtering of the horizontal direction discontinuity of the blocks for which the filtering of the vertical direction discontinuity is finished,
    wherein the horizontal edge filtering unit begins filtering the horizontal direction discontinuity of the blocks prior to completion of filtering the blocks by the vertical edge filter unit.

2. The filter of claim 1, wherein the horizontal edge filtering unit comprises:
    a first horizontal edge filter which performs filtering of a top block of a top macroblock pair; and
    a second horizontal edge filter which performs filtering of a bottom block of the top macroblock pair.

3. The filter of claim 1, wherein the vertical edge filtering unit and the horizontal edge filtering unit perform filtering in order from a block of a macroblock located on a top left-hand side of the macroblock, to a downward direction.

4. The filter of claim 3, wherein when the filtering of the horizontal direction discontinuity is performed in a macroblock encoded in a MacroBlock Adaptive Frame Field (MBAFF) mode, if a top macroblock pair is a field macroblock pair and a current macroblock belongs to a frame macroblock pair and a top macroblock, the determination unit determines a start point of the filtering of the vertical direction discontinuity.

5. The filter of claim 4, wherein, for a luminance macroblock, when blocks forming the luminance macroblock are numbered in order from a block located on the top left-hand side to the downward direction, a point where the filtering of the vertical direction discontinuity of a sixth block is finished is determined as a start point of the filtering of the horizontal direction discontinuity.

6. The filter of claim 4, wherein, for a chrominance macroblock, the filtering of the horizontal direction discontinuity is determined to begin after filtering of the vertical direction discontinuity forming the chrominance macroblock is finished.

7. The filter of claim 1, wherein the predetermined size is 4×4.

8. The filter of claim 1, wherein the vertical direction discontinuity is defined by a discontinuity of an image on a vertical boundary between blocks, and the horizontal direction discontinuity is defined by a discontinuity of an image on a horizontal boundary between blocks.

9. The filter of claim 1, wherein the start point of filtering represents a point of progress of the sequential filtering of the blocks by the vertical edge filtering unit.

10. The filter of claim 1, wherein the horizontal edge filtering unit begins filtering the horizontal direction discontinuity of the blocks when progress of the vertical direction discontinuity filtering of the blocks by the vertical edge filter unit reaches the determined start point.

11. The filter of claim 1, wherein the filtering of the horizontal direction discontinuity of the blocks by the horizontal edge filtering unit is performed concurrently with the filtering of the vertical direction discontinuity of the blocks by the vertical edge filtering unit.

12. The filter of claim 1, wherein the staff point of filtering to eliminate the horizontal direction discontinuity is at least after the filtering of the vertical direction discontinuity for two neighboring blocks located on the top left-hand side is finished.

13. A method, in a computing device comprising a processor having computing device-executable instructions, of eliminating discontinuity of block boundaries of an image encoded in units of blocks with a predetermined size, the method comprising:

eliminating, using the processor, a vertical direction discontinuity of the blocks, by sequentially filtering the blocks;

determining a start point of filtering of a horizontal direction discontinuity of the blocks according to a filtering mode of a macroblock formed with the blocks; and if the eliminating of the vertical direction discontinuity of the blocks reaches the start point, performing sequentially filtering of the horizontal direction discontinuity of the blocks for which the filtering of the vertical direction discontinuity is finished, wherein the filtering of the horizontal direction discontinuity of the blocks begins prior to completion of filtering the vertical direction discontinuity of the blocks.

14. The method of claim 13, wherein in eliminating the vertical direction discontinuity of the blocks and performing sequentially filtering of the horizontal direction discontinuity, filtering is sequentially performed in order from a block of a macroblock which is located on a top left-hand side of the macroblock, to a downward direction.

15. The method of claim 14, wherein in determining a start point of filtering of the horizontal direction discontinuity, if performed in a macroblock encoded in a MacroBlock Adaptive Frame Field (MBAFF) mode, if a top macroblock pair is a field macroblock pair and a current macroblock belongs to a frame macroblock pair and a top macroblock, a start point of filtering of the vertical direction discontinuity is determined.

16. The method of claim 15, wherein, for a luminance macroblock, if blocks forming the luminance macroblock are numbered in order from a block located on the top left-hand side to the downward direction, a point where filtering of the vertical direction discontinuity of a sixth block is finished is determined as a start point of filtering of the horizontal direction discontinuity.

17. The method of claim 15, wherein, for a chrominance macroblock, the filtering of the horizontal direction discontinuity is determined to begin after the filtering of the vertical direction discontinuity of blocks forming the chrominance macroblock is finished.

18. The method of claim 15, wherein if performing filtering of the horizontal direction discontinuity, filtering the top block forming the top macroblock pair and filtering the bottom block forming the macroblock pair are performed at the same time.

19. The method of claim 13, wherein the predetermined size is 4×4.

20. The method of claim 13, wherein the vertical direction discontinuity is defined by a discontinuity of an image on a vertical boundary between blocks, and the horizontal direction discontinuity is defined by discontinuity of an image on a horizontal boundary between blocks.

21. The method of claim 13, wherein the start point of filtering represents a point of progress of the filtering of the vertical direction discontinuity of the blocks.

22. The method of claim 13, wherein the filtering of the horizontal direction discontinuity of the blocks begins when progress of filtering the vertical direction discontinuity of the blocks reaches the determined start point.

23. The method of claim 13, wherein the filtering of the horizontal direction discontinuity of the blocks is performed concurrently with the filtering of the vertical direction discontinuity of the blocks.

24. The method of claim 13, wherein the staff point of filtering to eliminate the horizontal direction discontinuity is at least after the filtering of the vertical direction discontinuity for two neighboring blocks located on the top left-hand side is finished.

25. A computer readable recording medium comprising:

a computer program for executing, in a computing device comprising a processor having computing device-executable instructions, a method of eliminating a discontinuity of block boundaries of an image encoded in units of blocks, comprising, eliminating, using the processor, a vertical direction discontinuity of the blocks, by sequentially filtering the blocks;

determining a start point of filtering of a horizontal direction discontinuity of the blocks according to a filtering mode of a macroblock formed with the blocks; and if the filtering for eliminating the vertical direction discontinuity of the blocks reaches the start point of filtering of the horizontal direction discontinuity, performing filtering of the horizontal direction discontinuity of the blocks for which the filtering of the vertical direction discontinuity is finished, wherein the filtering of the horizontal direction discontinuity of the blocks begins prior to completion of filtering the vertical direction discontinuity of the blocks.

* * * * *